United States Patent
Russell

[11] 3,841,419
[45] Oct. 15, 1974

[54] CONTROL OF COLLIGATIVE PROPERTIES OF DRILLING MUD

[75] Inventor: Kenneth L. Russell, Tulsa, Okla.

[73] Assignee: Cities Service Oil Company, Tuska, Okla.

[22] Filed: Sept. 14, 1973

[21] Appl. No.: 397,561

Related U.S. Application Data
[63] Continuation-in-part of Ser. No. 211,566, Dec. 23, 1971, abandoned.

[52] U.S. Cl............ 175/40, 175/66, 175/72, 252/8.5 C
[51] Int. Cl............................ E21b 21/04
[58] Field of Search........... 175/40, 66, 50, 65, 72; 285/8.5 C; 23/230 EP

[56] References Cited
UNITED STATES PATENTS

| | | | |
|---|---|---|---|
| 2,213,905 | 9/1940 | Clark | 175/50 X |
| 2,320,681 | 6/1943 | Thompson | 23/230 |
| 2,868,725 | 1/1959 | Owen | 175/72 X |
| 3,208,524 | 9/1965 | Horner et al. | 175/72 X |
| 3,319,715 | 5/1967 | Parks | 175/65 |
| 3,561,548 | 2/1971 | Mondshine | 252/8.5 X |
| 3,646,997 | 3/1972 | Chenevert | 175/65 X |
| 3,688,851 | 9/1972 | Chenevert | 175/65 |

Primary Examiner—Frank L. Abbott
Assistant Examiner—Richard E. Favreau
Attorney, Agent, or Firm—A. Joe Reinert

[57] ABSTRACT

Osmotic loss of aqueous phase from a drilling mud is mitigated by adding thereto a material having colligative properties comprising a carbohydrate, such as sucrose or starch, and also optionally containing a salt such as potassium chloride. Preferably, drill bit cuttings from the formation are cleaned of extraneous matter, dried on the surface, compressed to extract aqueous interstitial liquid therefrom, the osmolality of the interstitial fluid determined, and sufficient material comprising a carbohydrate having colligative properties added to the aqueous phase of the drilling mud that aqueous liquid does not substantially pass from the aqueous phase of the drilling mud into the formation.

16 Claims, 3 Drawing Figures

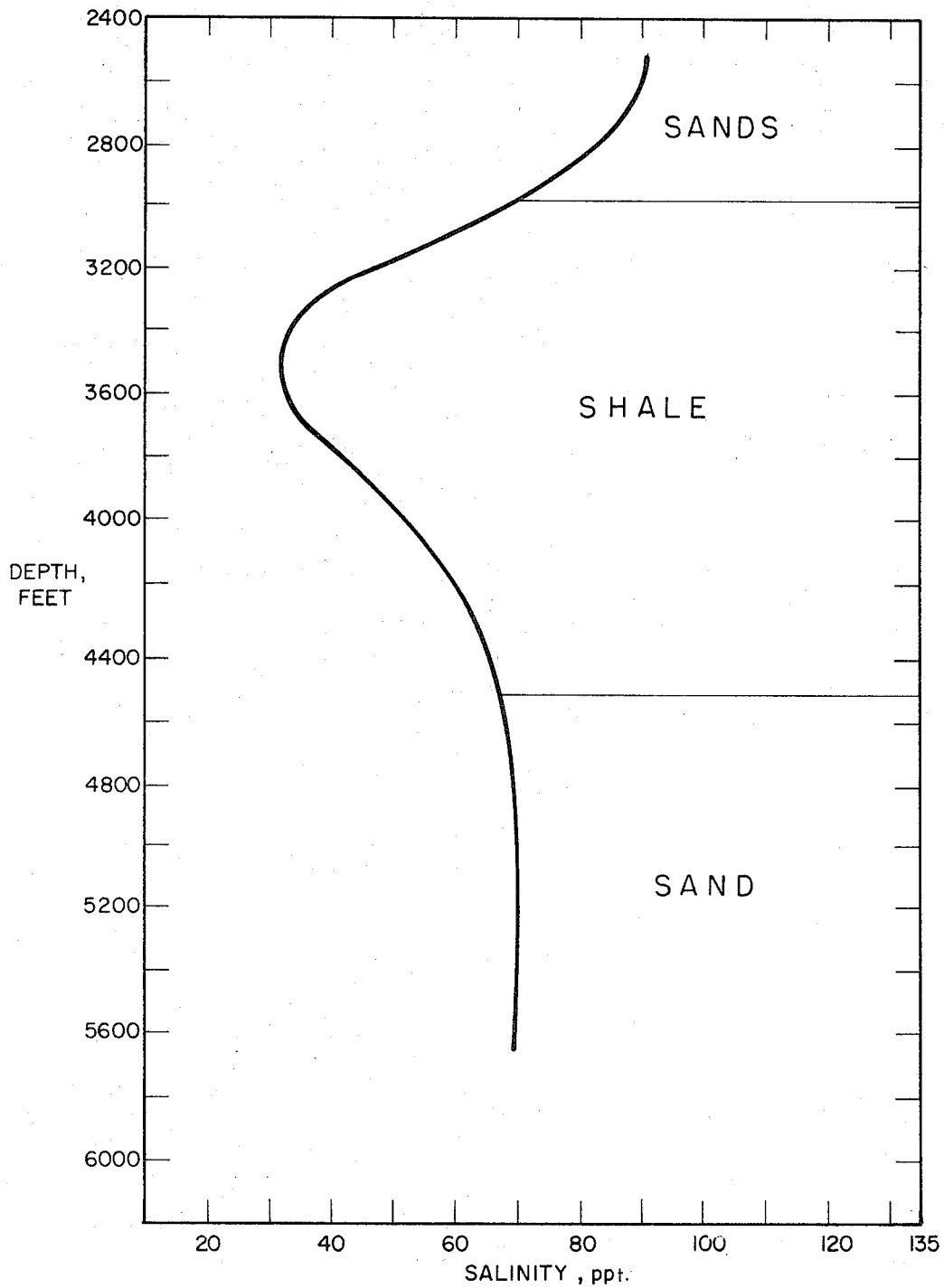

CONTROL OF COLLIGATIVE PROPERTIES OF DRILLING MUD

BACKGROUND OF THE INVENTION

This application is a continuation-in-part of application Ser. No. 211,566 filed Dec. 23, 1971, by Kenneth L. Russell, and having copendency herewith and now abandoned.

This invention relates to a process for the control of osmolality of drilling mud employed in drilling for hydrocarbons and the like.

In the drilling of wells for oil and gas, problems relating to the osmotic difference between the aqueous phase of the drilling mud and the interstitial aqueous phase of the subterranean formation being drilled are encountered. If the difference in osmolality is sufficient to drive aqueous liquid from the drilling mud into the formation, two very serious problems are encountered.

One problem involves movement of aqueous liquid into shale formations which contain swelling clays. This results both in an increase in volume and a loss of structural strength of the shale, the very undesirable effects of sloughing of the formation into the bore hole, and even more deleterious binding of the drill string.

Considerable differences in the osmolality of the aqueous phase of the drilling mud in the interstitial aqueous phase of the subterranean formation can also result in substantial losses of the fluid of the drilling mud. Loss of adequate circulation with sticking of the drill string can be the result.

To mitigate such problems resulting from differences in osmolality between the aqueous liquid of the subterranean formation and the aqueous phase of the drilling mud, various remedies are taught by the prior art which have enjoyed a considerable measure of success. Thus, the prior art teaches use of oil-base drilling muds or of water-in-oil invert emulsion-base drilling muds to mitigate the problem. It is also taught to add metallic salt such as potassium chloride, sodium chloride, magnesium sulfate, magnesium chloride, calcium chloride, zinc sulfate, lead chloride, and the like to the aqueous phase of the drilling mud to balance its osmolality with the osmolality of the interstitial aqueous phase of the subterranean formation.

These remedies, beneficial though they have been for alleviating the problems resulting from differential osmolalities, still have not provided the optimum solution for the problem. Thus, oil-based drilling muds and drilling muds employing an invert emulsion of water in oil have lead to environmental pollution and disposal problems. In fact, such drilling muds have been banned in many situations because of the potential for environmental damage. Likewise, drilling muds loaded with very large amounts of electrolytes interfere with logging and other operations, promote corrosion, present disposal problems, and present potential for environmental damage.

Thus, there is a considerable need for a process for balancing osmolality of the aqueous phase of a drilling mud with the osmolality of the interstitial aqueous phase of a subterranean formation which does not require use of large amounts of electrolytes.

OBJECTS OF THE INVENTION

An object of the invention is to provide a process for balancing osmolality of the aqueous phase of a drilling mud with the osmolality of the interstitial aqueous phase of a subterranean formation penetrated by a bore hole.

It is also an object of this invention to provide a process for controlling the osmolality of drilling mud to prevent shale sloughing and water loss to formations having high osmolality which comprises collecting drill bit cuttings from the formation being drilled, removing extraneous matter from the drill bit cuttings and drying the surface of the drill bit cuttings, compressing the drill bit cuttings to extract the interstitial aqueous liquid therefrom, measuring the osmolality of the interstitial aqueous liquid extracted from the drill bit cuttings, and adding a soluble compound having colligative properties to the aqueous phase of the drilling mud to lower the osmotic differential pressure between the aqueous phase of the drilling mud in the aqueous interstitial liquid.

The process of the instant invention provides a means for controlling and adding only the minimal amount of electrolyte to a drilling mud which is needed to prevent problems associated with large differences between the osmolality of the drilling mud and the osmolality of the interstitial aqueous liquid, and provides a means for balancing the osmolality of the aqueous phase of the drilling mud with the osmolality of the interstitial aqueous phase of the subterranean formation by employing readily biodegradable materials which do not present a threat to the environment or disposal problems.

SUMMARY OF THE INVENTION

The instant invention relates to a process for balancing osmolality of the aqueous phase of a drilling mud with the osmolality of the interstitial aqueous phase of a subterranean formation penetrated by a wellbore which comprises solublizing sufficient of a composition comprising a soluble carbohydrate having colligative properties, that is, a monomolecular constituent, into the aqueous phase of the drilling mud that osmotic difference of the aqueous phase of the drilling mud and the interstitial aqueous phase of the subterranean formation lacks sufficient drive to cause the aqueous liquid to move from the drilling mud into the formation. Osmolality of drilling mud is controlled to prevent shale sloughing and water loss to formations having high osmolality is prevented by collecting drill bit cuttings from the formation being drilled, removing extraneous matter from the drill bit cuttings and drying the surface of the drill bit cuttings, compressing the drill bit cuttings to extract the interstitial aqueous liquid therefrom, measuring the osmolality of the interstitial aqueous liquid extracted from the drill bit cuttings, and adding a soluble compound having colligative properties to the aqueous phase of the drilling mud to lower the osmotic differential pressure between the aqueous phase of the drilling mud and the aqueous interstitial liquid.

In other terminology, the process relates to determining the monomolecular constituent ionic concentration of the drill bit cuttings produced at the wellhead with the drilling mud and adjusting the drilling mud salinity to balance the salinity of the drilling mud to approximate the salinity of the formation being penetrated by the drill bit in order to minimize the osmotic pressure gradiant formed between the drilling mud and the formation. In general, the determination of the monomolecular constituent ionic concentration is accomplished through, for example, a resistivity or refractive index measurement of the salinity of the connate water squeezed from the drill bit cuttings. The salinity of the drilling mud, if required, may be increased through the addition of drilling mud salts, sugar, or other monomolecular constituents to the drilling mud, or, if the drilling mud requires a decrease in salinity, through the addition of fresh water to the drilling mud.

BRIEF DESCRIPTION OF THE DRAWINGS

The present invention may be more readily understood through referral to the accompanying figures in which:

FIG. 3 represents the salinity in parts per million measured in drilling muds utilized to drill a well through shale and sand zones to a depth of 6,000 feet.

DESCRIPTION OF THE PREFERRED EMBODIMENTS

Figure 1:
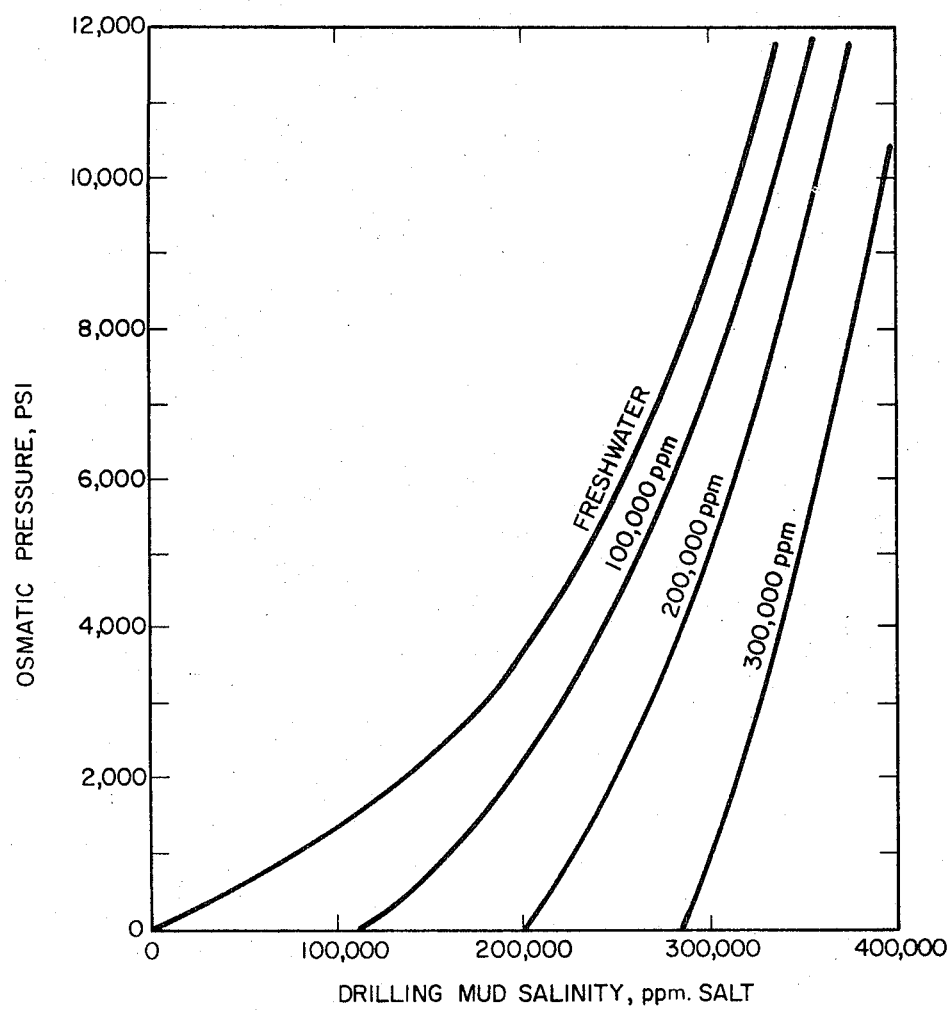
FIG. 1 represents drilling mud water phase salinity in parts per million of salt versus the resultant matrix stress in psi representing the osmotic pressure gradiant of a formation resulting from the introduction of drilling muds having the salinity concentration depicted in the figure.

According to one presently preferred embodiment osmolality of the aqueous phase of a drilling mud is balanced with the osmolality of the interstital aqueous phase of a subterranean formation which is penetrated by a wellbore by a process comprising solublizing sufficient of a composition comprising a carbohydrate having colligative properties into the aqueous phase of the drilling mud that osmotic differential between the aqueous phase of the drilling mud and the interstitial aqueous phase of the subterranean formation is less than sufficient to drive aqueous liquid from the drilling mud into the formation.

The carbohydrate having colligative properties can include any water soluble carbohydrate which is known to increase osmolality, lower freezing point, or raise the boiling point of water when dissolved therein. Examples of some suitable carbohydrates include starches, modified cellulose products, sucrose, maltose, glucose, fructose, and the like. Of course, products containing such carbohydrates can also be employed if desired including materials such as molasses, syrups, and the like. Chemically modified carbohydrates can also be employed. It is presently particularly preferred to employ starches which are rapidly solubilized in water of sucrose because of their low cost and ready availability. By soluble it is meant solubility of the carbohydrates in the aqueous phase of the mud to the extent added to balance the osmolality.

According to another presently preferred embodiment of the invention, the osmolality of drilling mud is controlled to prevent shale sloughing and water loss to formations having high osmolality by a process which comprises collecting drill bit cuttings from the formation being drilled, removing extraneous matter from the drill bit cuttings and drying the surface of the drill bit cuttings, compressing the drill bit cuttings to extract the interstitial aqueous liquid therefrom, measuring the osmolality of the interstitial aqueous liquid extracted from the drill bit cuttings, and adding a soluble compound having colligative properties to the aqueous phase of the drilling mud to lower the osmotic differential pressure between the aqueous phase of the drilling mud and the aqueous interstitial liquid.

Soluble compounds having colligative properties are well known to those skilled in the art. Colligative properties, of course, include the ability of a solute dissolved in a solvent to raise the boiling point of the solvent, lower its freezing point, or increase its osmolality. Examples of such solute compounds include materials such as sucrose, soluble starches, fructose, glucose, maltose, sodium chloride, potassium chloride, calcium chloride, sodium sulfate, magnesium chloride, magnesium sulfate, sodium silicate, zinc sulfate, lead chloride, and the like.

The osmolality of the interstitial aqueous liquid extracted from the drill bit cuttings can be measured by several means well known to the art. For example, the resistivity of the aqueous fluids can be measured to give a value of salinity since the osmolality of such waters is substantially the result of salinity. In other words, the osmolality of these interstitial aqueous liquids which are extracted are directly related to the salinity thereof. A method for measuring the salinity of the aqueous phase of the drilling muds is disclosed in co-pending application, Ser. No. 154,622. By this method, the drill bit cutting samples produced with the drilling mud in the drilling sequence are continuously monitored. Samples of drill bit cuttings will arrive at the surface suspended in the circulating drilling mud at calculable times after being cut from the formation. Samples are gathered in a shale shaker and washed in a screen having about ¼ inch mesh, utilizing fresh or distilled water. The mud and fine cuttings are then discarded. Large drill bit cuttings are gathered by hand or mechanically in order to provide fresh pieces of rock which are free of mud. These drill bit cuttings are individually dried with paper towels. The dried samples may then be further dried at room temperature until no moisture is visible. Room drying generally requires 15 minutes. A press can be utilized and loaded with 40–50 drill bit chips, which represent approximately 15 grams a sample. The chips can be pressured to pressures in excess of 5,000 psi. The interstitial waters are thus driven from the drill bit cuttings during pressuring so that about 0.5 to 1 milliliters of interstitial aqueous fluid are provided for analysis from the 40–50 grams of chips. The interstitial aqueous liquids are analyzed for cationic concentration so as to determine the salinity of the interstitial or connate waters of the drill bit cuttings and thus determine or measure the osmolality thereof. The osmolality is determined so that the osmolality required for the drilling mud may be determined in order to prevent a high osmotic pressure gradiant from being formed between the aqueous phase of the formation and the aqueous phase of the drilling mud.

To more readily depict the process of the present invention, referral to FIG. 1 is suggested in which a drilling mud water salinity (approximate osmolality) versus matrix stress or osmotic pressure in psi is disclosed for interstitial water salinities having fresh water, 100,000 ppm, 200,000 ppm, and 300,000 ppm, respectively with intermediate salinities falling between the gradiant lines depicted in the figure. The drilling mud osmolality is matched with salinity or osmolality of the formations to prevent movement of fresh water from the drilling mud into the formations.

Figure 2:
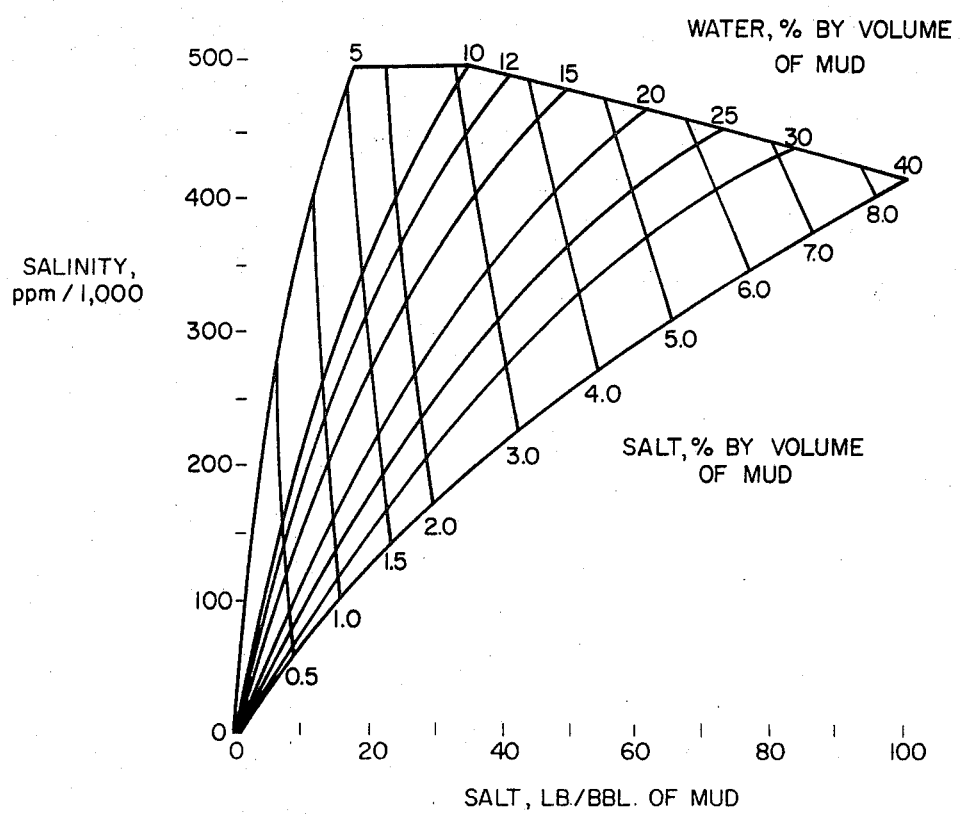
FIG. 2 represents the pounds of salt or material having colligative properties per barrel of mud which may be added to the drilling mud in order to achieve the salinity concentration as required by FIG. 1 in order to minimize osmotic pressures developed between the drilling mud and the formations being penetrated by a drill bit.

The exact amount of material having colligative properties such as electrolyte salt, sugar, starch, or other monomolecular constituents which must be added to the drilling mud in order to raise the osmolality or monomolecular constituent concentration or material having colligative properties concentration when sand formations are encountered is most readily depicted by referral to FIG. 2 in which the salt concentration in pounds per barrel of mud is depicted for salt in the water phase in parts per million for the salinity derived through the salt addition to the drilling mud. As is well known to those skilled in the art, equivalent amounts of other materials having colligative properties can be substituted for the salt concentration when the salt concentration needed is given. Therefore, should an osmolality equivalent or comparable to a salinity of, for example, 300,000 ppm be required in order to match an osmolality related to 300,000 ppm salinity of the sand formation being penetrated by the drill bit utilizing a mud having, for example, 30 percent by volume in mud, one would find that a material having colligative properties equivalent to 48 pounds of salt (NaCl) per barrel of mud must be contained within the drilling mud in order to match the osmolality equivalent to the salinity of the drilling mud to the osmolality related to the salinity of the formation in order to prevent a driving of aqueous liquid from the aqueous phase of the drilling mud into the formation. By way of further exemplification, should a shale zone be drilled having an osmolality related a 50,000 ppm salt salinity contained therein, a minimum amount of material having colligative properties equivalent to the minimum salt concentration per barrel of mud in the order of 2 to 3 pounds of salt per barrel is required.

As a further example of the utilization of the process of the instant invention, FIG. 3 depicts the salinity in parts per million of a drilling mud required in encountering the shale and sand formations between 2,400 and 6,000 feet in depth of a well being drilled. During the drilling sequence, high salinity fluids are first encountered between the 2,400 to 3,000 foot depth interval in the well with the shale zone being encountered having a low salinity to a minimum of 32,000 ppm as encountered between the 3,000 to 4,500 foot interval within the wellbore with a high salinity sand then being encountered to the 6,000 foot target depth of the well. In this instance, the osmolality of the drilling mud was adjusted in accordance with the related salinities of the sand and shale formations encountered in order to prevent movement of aqueous liquid from or into the drilling mud and providing an adequate lubricity and a dense drilling mud throughout the drilling sequence.

By way of further exemplification, a well is drilled in search of hydrocarbons. Drill bit cuttings are collected at various intervals on a regular program by means of a shaker from the drilling mud returned from the well. Mud is washed from the drill bit cuttings and the surface of the drill bit cuttings is dried by placing on an absorbent surface. The drill bit cuttings are then placed in the hydraulic press and compressed until interstitial aqueous liquid is produced therefrom. A sample of this interstitial aqueous liquid is analyzed to determine the cationic concentration therein, and from this the osmolality thereof is determined. In response to this determination, a soluble compound having colligative properties is admixed in the aqueous phase of the drilling mud in an amount sufficient to increase the osmolality of the aqueous phase of the drilling mud to approximately the level the osmolality of the interstitial aqueous liquid.

In a series of runs, NaCl, KCl, mixtures of KCl and a soluble starch, sucrose, and sucrose plus NaCl are employed.

Problems associated with differences in osmolality between the formation and the aqueous phase of the drilling mud are thus avoided. Also, excessive amounts of salts are not added to the drilling mud, only the minimal amount needed is added.

For convenience in understanding the invention, it is helpful at this point to consider some fundamentals of that branch of physical chemistry which is concerned with osmotic forces. When an aqueous solution of a solute is separated from an aqueous solution of the same solute at a different concentration, or for that matter pure water, the solvent, which in this case is water, tends to migrate from the solution of lower concentration (or zero concentration, as the case may be), into the solution of higher concentration, thus setting up a pressure difference across the membrane which may be expressed in any convenient pressure unit, such as in pounds per square inch (psi). It is convenient to use the term real osmolality to express the effective concentration of solute. This term, which is widely used in biological disciplines, such as physiology and biochemistry, is fully defined with numerous examples and tables in the Geigy Scientific Tables, 6th Edition, Ardsley, New York, 1962, Pages 324–327. It is also defined in Handbook of Chemistry and Physics, Edition 47, Page D-139, Cleveland, Ohio, 1966. Real osmolality is equal to the ratio of real freezing point depression caused by the solute to the factor 1.858. The term "ideal osmolality," is equal to molality multiplied by the number of ions into which the undissociated solute breaks down on complete dissociation.

For most actual solutes, and in particular, for those playing a part in the drilling fluids in formations treated by this invention, real osmolality differs from ideal osmolality by well-known osmotic coefficient; the osmotic coefficient is the ratio of real osmolality to ideal osmolality. The osmotic coefficient for salts of interest may be found tabulated in various reference books, such as the Geigy publication already cited or may be readily determined by simple experiment not amounting to invention. Experimental data from which it may be readily calculated may be found in current editions of Handbook of Chemistry and Physics and in other sources. Particularly useful tables, showing osmotic coefficients at various temperatures for a variety of salts at a wide range of concentrations, are given in the book, "Electrolyte Solutions," by R. A. Robinson, et al., Plenum Press, New York, 1959. For nonionizing materials such as the sugar, starch, or other saccharides of this invention, osmolality is approximately proportional to the molecular weight thereof. Osmolality, freezing point depression, ability to raise the boiling point of a solute, and partial pressure effects are known as colligative properties.

From the above discussion, it is clear that if two solutions have the same real osmolality, then they will have the same osmotic pressure, based upon the pure solvent at the same temperature, no matter how osmoality is maintained.

The present invention is well adapted to carry out the objects and attain the ends and advantages mentioned as well as those inherent therein. While presently preferred embodiments of the invention have been given for purposes of disclosure, numerous changes will readily suggest themselves to those skilled in the art which are encompassed within the spirit of the invention and the scope of the appended claims.

What is claimed is:

1. A process for balancing osmolality of the aqueous phase of a drilling mud with the osmolality of the interstitial aqueous phase of a subterranean formation penetrated by a wellbore which comprises solubilizing sufficient of a composition comprising a soluble carbohydrate having colligative properties into the aqueous phase of the drilling mud that osmotic difference between the aqueous phase of the drilling mud and the interstitial aqueous phase of the subterranean formation is less than sufficient to drive aqueous liquid from the drilling mud into the formation.

2. The process of claim 1 wherein the composition comprising a soluble carbohydrate also comprises an electrolyte.

3. The process of claim 1 wherein the composition comprising a carbohydrate comprises starch plus potassium chloride.

4. The process of claim 1 wherein the composition comprising a carbohydrate comprises a disaccharide.

5. The process of claim 4 wherein the disaccharide is sucrose.

6. The process of claim 1 wherein the osmolality of the interstitial aqueous liquid in the drill bit cuttings from the bore hole is determined and wherein sufficient of a composition comprising a soluble carbohydrate is added to the drilling mud that the osmolality of the aqueous phase of the drilling mud approximates the osmolality of the interstitial aqueous liquid of the drilling bit cuttings as determined.

7. The process of claim 6 wherein the carbohydrate is starch and wherein the composition comprising the carbohydrate also comprises potassium chloride.

8. The process of claim 7 wherein the starch is a rapidly water solubilizable starch.

9. The process of claim 6 wherein the carbohydrate is a disaccharide.

10. The process of claim 9 wherein the disaccharide is sucrose.

11. A process for controlling the osmolality of drilling mud to prevent shale sloughing and water loss to formations having high osmolality which comprises:
   a. collecting drill bit cuttings from the formation being drilled;
   b. removing extraneous matter from the drill bit cuttings and drying the surface of the drill bit cuttings;
   c. compressing the drill bit cuttings to extract the interstitial aqueous liquid therefrom;
   d. determining the osmolality of the interstitial aqueous liquid extracted from the drill bit cuttings;
   e. adding a soluble compound having colligative properties to the aqueous phase of the drilling mud to lower the osmotic differential pressure between the aqueous phase of the drilling mud and the aqueous interstitial liquid.

12. The process of claim 11 wherein the material having colligative properties comprises a soluble carbohydrate.

13. The process of claim 12 wherein the material having colligative properties comprises starch plus potassium chloride.

14. The process of claim 13 wherein the starch is a rapidly water solubilizable starch.

15. The process of claim 12 wherein the soluble carbohydrate is a disaccharide.

16. The process of claim 15 wherein the disaccharide is sucrose.

* * * * *